US010726034B2

(12) United States Patent
Koukoumidis et al.

(10) Patent No.: US 10,726,034 B2
(45) Date of Patent: Jul. 28, 2020

(54) MODULAR ELECTRONIC DATA ANALYSIS COMPUTING SYSTEM

(71) Applicant: Microsoft Technology Licensing, LLC, Redmond, WA (US)

(72) Inventors: Emmanouil Koukoumidis, Kirkland, WA (US); Cezar Augusto Alevatto Guimaraes Neto, Redmond, WA (US); Adam Edward Shirey, Renton, WA (US); Anthony Turner, Bellevue, WA (US); Brian J. Alseth, Seattle, WA (US); Daniel Lee Massey, Redmond, WA (US); Michael Andrews, Redmond, WA (US); Richard P. Lozada, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1127 days.

(21) Appl. No.: 15/085,832

(22) Filed: Mar. 30, 2016

(65) Prior Publication Data

US 2017/0286503 A1 Oct. 5, 2017

(51) Int. Cl.
*G06F 16/16* (2019.01)
*G06F 16/25* (2019.01)
*G06F 16/22* (2019.01)
*G06F 16/951* (2019.01)
(Continued)

(52) U.S. Cl.
CPC ............ *G06F 16/25* (2019.01); *G06F 16/168* (2019.01); *G06F 16/21* (2019.01); *G06F 16/22* (2019.01); *G06F 16/24573* (2019.01); *G06F 16/951* (2019.01)

(58) Field of Classification Search
CPC .............................. G06F 16/907; G06F 16/168
See application file for complete search history.

(56) References Cited

U.S. PATENT DOCUMENTS 8,417,715 B1 4/2013 Bruckhaus et al.
8,607,242 B2 12/2013 Clarke
9,037,692 B2 5/2015 Ferris
(Continued)

OTHER PUBLICATIONS

Schall, Daniel, "Crowdsourcing Task Marketplaces", In Publication of Springer Briefs in Computer Science, Oct. 28, 2012, pp. 7-30.
(Continued)

*Primary Examiner* — Robert W Beausoliel, Jr.
*Assistant Examiner* — Nirav K Khakhar
(74) *Attorney, Agent, or Firm* — Alleman Hall Creasman & Tuttle LLP

(57) ABSTRACT

A server device configured to execute an electronic data analysis platform program to store a plurality of modular data processing tools, each modular data processing tool configured to perform data processing with predetermined data types and to combine with other modular data processing tools in a data analysis pipeline, receive a user input of one or more user data sources, map the data of the one or more user data sources to one or more of the predetermined data types, determine a data analytic goal for the mapped one or more user data sources, select one or more modular data processing tools configured to process the one or more predetermined data types mapped to data of the mapped one or more user data sources to generate the data analytic goal, and generate a data analysis pipeline configured to generate the data analytic goal.

17 Claims, 12 Drawing Sheets

(51) Int. Cl.
    *G06F 16/2457*    (2019.01)
    *G06F 16/21*      (2019.01)

(56) References Cited

U.S. PATENT DOCUMENTS

| | | |
|---|---|---|
| 2008/0256341 A1 | 10/2008 | Weisberg et al. |
| 2009/0287532 A1 | 11/2009 | Cohen et al. |
| 2013/0104132 A1 | 4/2013 | Chen et al. |
| 2013/0325856 A1 | 12/2013 | Soto Matamala et al. |
| 2015/0089626 A1 | 3/2015 | Korangy et al. |
| 2015/0286725 A1 | 10/2015 | Quist |

OTHER PUBLICATIONS

Pelluru, Sreedhar, "Use custom activities in an Azure Data Factory Pipeline", Published on: Oct. 19, 2015, Available at: https://azure.microsoft.com/en-in/documentation/articles/data-factory-use-custom-activities/.

Chaisiri, Sivadon, "Utilizing Human Intelligence in a Crowdsourcing Marketplace for Big Data", In Proceedings of IEEE International Conference on Parallel and Distributed Systems, Dec. 15, 2013, pp. 633-638.

"Create custom pipelines to process JSON messages", Retrieved on: Dec. 25, 2015, Available at: https://msdn.microsoft.com/en-us/library/dn789172.aspx.

"Azure: Announcing New Real-time Data Streaming and Data Factory Services", Published on: Oct. 31, 2014, Available at: http://weblogs.asp.net/scottgu/azure-announcing-new-real-time-data-streaming-and-data-factory-services.

ISA European Patent Office, International Search Report and Written Opinion Issued in PCT Application No. PCTUS2017/024212, dated Jun. 19, 2017, WIPO, 13 Pages.

MODULAR ELECTRONIC DATA ANALYSIS COMPUTING SYSTEM

BACKGROUND

Data generation is rapidly increasing and the need to process data to extract insights and knowledge is crucial for the success of many businesses and organizations. However, many organizations often lack the necessary resources to develop in-house custom data processing modules and pipelines that they need, or to even discover and integrate compatible solutions from other providers. Current big data processing solutions offer boxed solutions that solve only very domain-specific data processing needs. Domain-specific data processing solutions can require significant software development resources, which can be an impediment to development under a tight timeline or budget.

SUMMARY

To address the issues discussed above, a server device for a modular electronic data analysis platform program is provided. The server device comprising a processor and an electronic data analysis platform program executed by the processor, the electronic data analysis platform program configured to: store a plurality of modular data processing tools, each modular data processing tool configured to perform data processing with predetermined data types and to combine with other modular data processing tools in a data analysis pipeline, receive a user input of one or more user data sources, the one or more user data sources including data of undetermined data types, map the data of the one or more user data sources to one or more of the predetermined data types, determine a data analytic goal for the mapped one or more user data sources, select one or more modular data processing tools configured to process the one or more predetermined data types mapped to data of the mapped one or more user data sources to generate the data analytic goal, generate a data analysis pipeline configured to generate the data analytic goal, the data analysis pipeline including the mapped one or more user data sources and the one or more modular data processing tools, and process the mapped one or more user data sources with the data analysis pipeline to generate the data analytic goal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
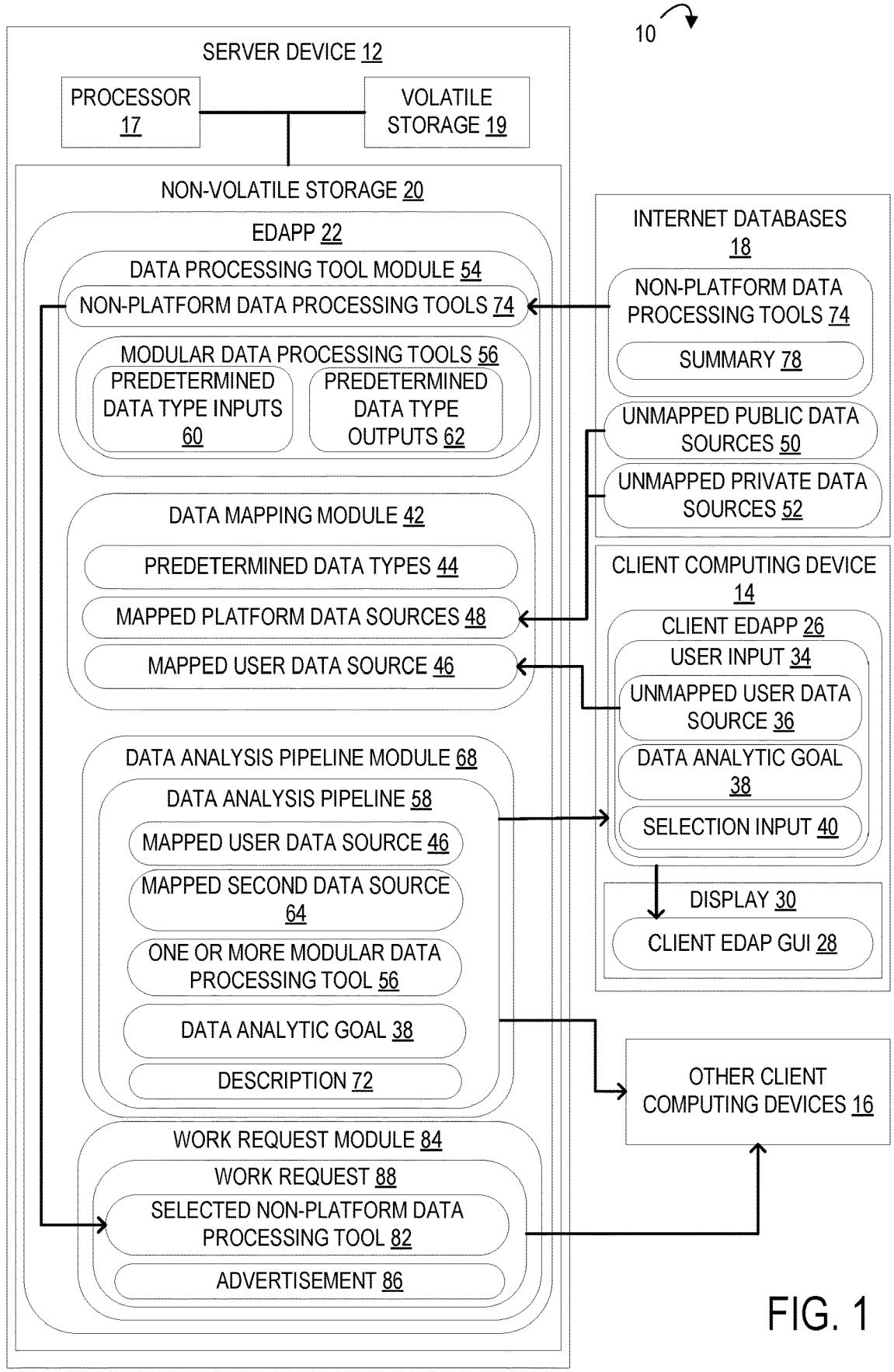
FIG. 1 shows an example computing system for an electronic data analysis platform program according to an embodiment of the present description.

FIG. 1 illustrates a computing system 10 according to one embodiment of the present disclosure. As shown, the computing system 10 includes a server device 12, which, for example, may take the form of a single server device or multiple server devices operating in a cloud computing configuration. The server device 12 is configured to communicate via a communication network with a client computing device 14, which, for example, may take the form of a desktop computing device, tablet computing device, etc. The server device 12 may also be configured to communicate via the communication network with other client computing devices 16 of other users, and Internet databases 18. The communication network includes wide area networks, wireless local area networks, etc.

Server device 12 includes a processor 17, a volatile storage 19, and a non-volatile storage 20. The non-volatile storage 22 includes instructions for an electronic data analysis platform program (EDAPP) 22 executed by the processor 16. The electronic data analysis platform program 22 is configured to communicate with a client electronic data analysis platform program 26 executed on the client computing device 14. It will be appreciated that each of the other client computing devices 16 may also execute instances of the client electronic data analysis platform program 26.

Figure 2:
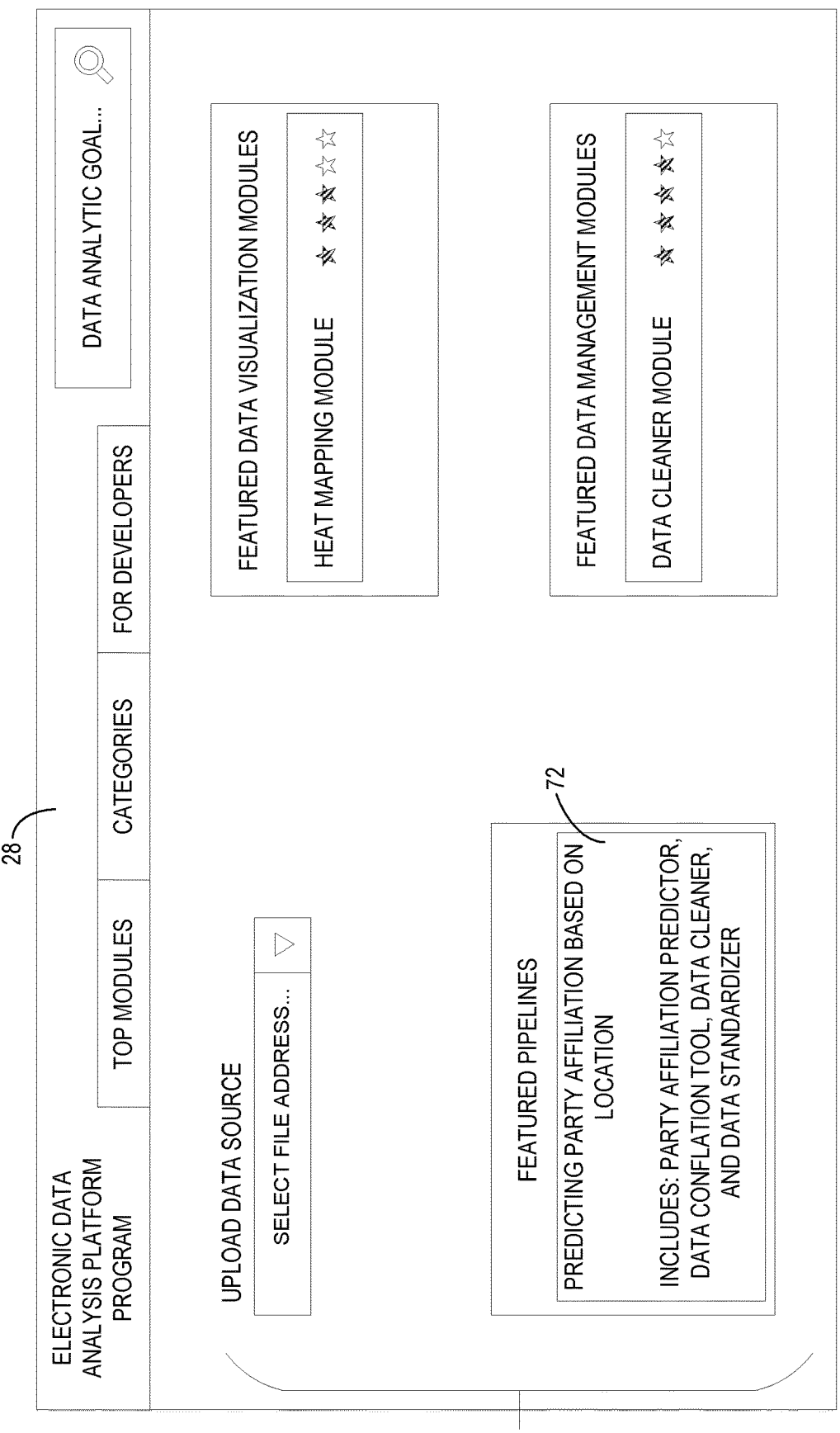
FIG. 2 shows an example client electronic data analysis platform program graphical user interface for the computing system of FIG. 1.

The client electronic data analysis platform program 26 is configured to display a graphical user interface (GUI) 28 on a display 30 associated with the client computing device 14. FIG. 2 illustrates an example client electronic data analysis platform program GUI 28 which includes a plurality of GUI elements 32. By interacting with the plurality of GUI elements 32, the user may enter user input 34 that is sent by the client electronic data analysis platform program 26 to the electronic data analysis platform program executed on the server device 12. The user may interact with the plurality of GUI elements 32 via any suitable input method, which, for example, may take the form of keyboard and mouse input, touch input, speech input, etc.

Turning back to FIG. 1, the user input 34 may include inputs of one or more user data sources including an unmapped user data source 36, a data analytic goal 38, and selection inputs 40. However, it will be appreciated that other user inputs 34 may also take other suitable forms, such as user authentication information, changes to user profile settings, and GUI navigation inputs as a few non-limiting examples. Thus, according to the methods discussed above, the client computing device 14 is configured to receive a user input 34 of one or more user data sources 36, the one or more user data sources 36 including data of undetermined data types, and send the one or more user data sources 36 to the server device 12.

The electronic data analysis platform program 22 executed on the server includes a data mapping module 42 that is configured to receive the user input 34 of one or more user data sources 36, the one or more user data sources 36 including data of undetermined data types.

Figure 3:
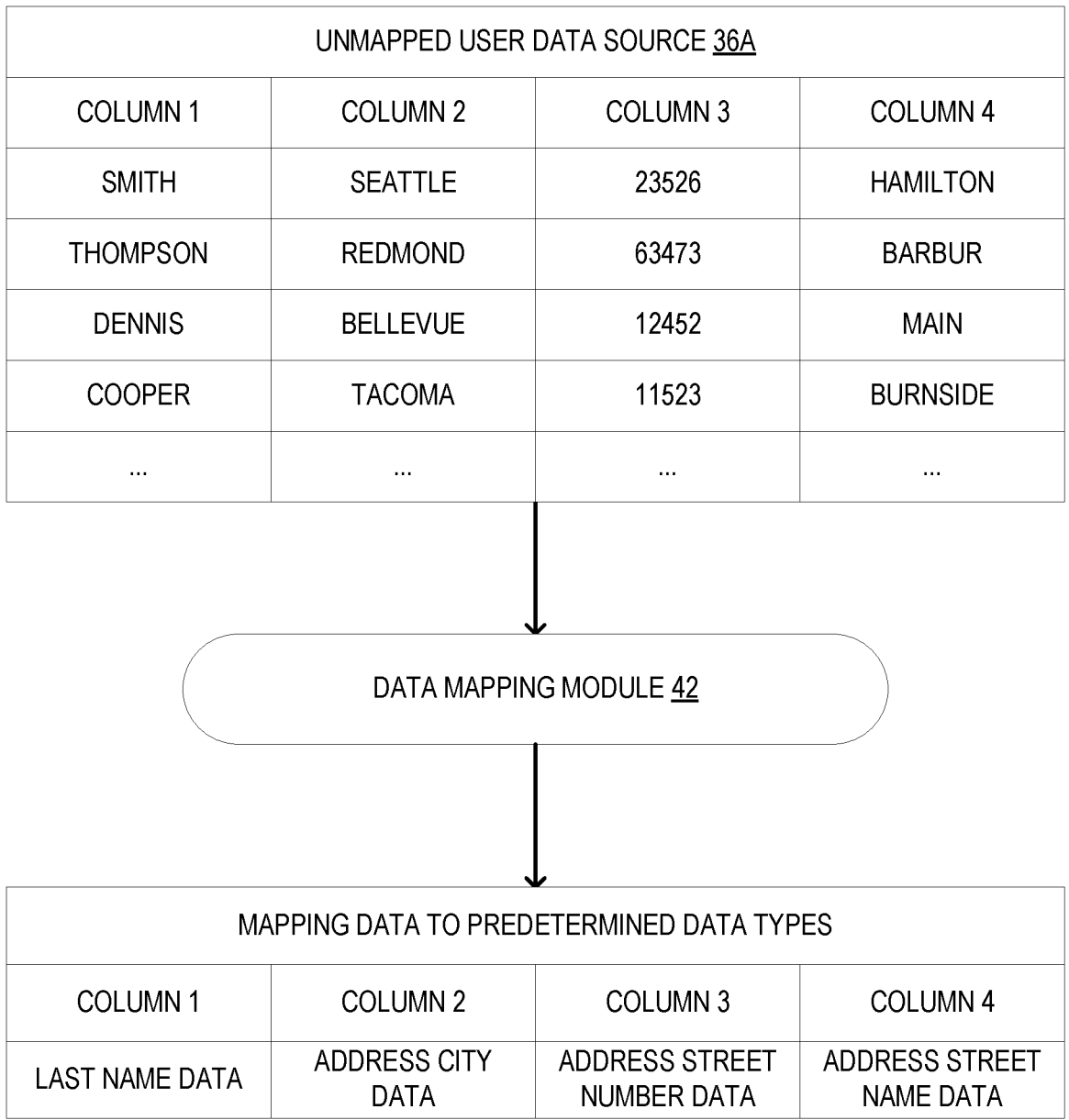
FIG. 3 shows an example unmapped user data source and corresponding predetermined data types for the electronic data analysis platform program of FIG. 1.

FIG. 3 illustrates an example unmapped user data source 36A, which, for example, may take the form of an electronic spreadsheet file, a plain text file, etc. The example unmapped user data source 36A includes four columns of data, each column including the same type of data. At the time of upload to the server device 12, the data included in the unmapped user data source 36A has undetermined data types. That is, the electronic data analysis platform program 22 executed on the server device 12 does not know what type of data that the unmapped user data source 36A includes.

The data mapping module 42 of the electronic data analysis platform program 22 is configured to map the data of the one or more user data sources 36 to one or more of the predetermined data types 44. The predetermined data types 44 are data types that are standardized and set for the electronic data analysis platform program 22. The predetermined data types 44 may include, for example, First Name Data, Last Name Data, Address Data, Date of Birth Data. Phone Number Data, Income Level Data, Demographic Data, Email Address Data, or any other suitable types of data.

In one embodiment, the data mapping module 42 uses intelligent column type inference to map the data of the one or more user data sources including the unmapped user data source 36 to the predetermined data types 44. The data mapping module 42 may include a rules engine to predict what type of data each column in a data source contains. For example, the type of data for a column may be predicted based on the head or name of the column in the data source. If the column name is "first_name", then the data for that column may be mapped to a First Name Data predetermined data type. As another example, the type and actual values of the data contained in a particular column may be used to predict the data type. If the column contains values such as "Smith" and "Thompson", then the data may be mapped to a Last Name Data predetermined data type. Whereas if the column contains values such as "Seattle", "Redmond", and "Bellevue", then the data may be mapped to an Address City Data predetermined data type. As yet another example, a particular column's location relative to other columns may be used to predict that particular column's data type. If column five contains city names, column six contains integer numbers, and column seven includes street names, then column six may be mapped to not just an Integer Number predetermined data type, but to a Street Number predetermined data type. It will be appreciated that these specific examples are merely illustrative, and that other types of rules and methods of mapping data to the predetermined data types 44 specifically not discussed above may also be utilized.

As illustrated in FIG. 3, the data of the example unmapped user data source 36A is mapped to the predetermined data types 44 by the data mapping module 42. In this specific example, column one of the unmapped user data source 36A includes the values "Smith", "Thompson", "Dennis", and "Cooper". Thus, the data mapping module 42 maps the data of column one to the predetermined data type Last Name Data. Next, as column two includes the names of cities, the data mapping module 42 maps the data of column two to the predetermined data type Address City Data. Given that column three includes integer values and is located next to column two which contains Address City Data, and column four which contains words commonly associated with street names, the data mapping module 42 maps the data of column three to the predetermined data type Address Street Number Data, and the data of column four to the predetermined data type Address Street Name Data.

In one embodiment, if the data mapping module 42 cannot precisely map a column of data to a predetermined data type 44, the data mapping module 42 may prompt the user to enter a disambiguation input to specify what kind of data that column contains. For example, because column three includes integer values of five digits, the data mapping module 42 may determine that column three may contain either predetermined data types of Address Street Number Data or Address Zip Code Data. Thus, the data mapping module 42 may prompt the user to enter a disambiguation input to specify which predetermined data type 44 column three contains. Alternatively or in addition to the above embodiments, the user may map each column manually to the predetermined data types 44.

Turning back to FIG. 1, the data mapping module 42 maps the unmapped user data source 36 to the predetermined data types 44 and stores the resultant mapped one or more user data sources 46. In one embodiment, the data mapping module 42 is configured to send the mapped one or more user data sources 46 to the client computing device 14, which is configured to receive, from the server device 12, mapped one or more user data sources 46 including data mapped to one or more predetermined data types 44.

As illustrated, the data mapping module 42 also stores mapped platform data sources 48 in addition to any data sources uploaded by the user of client computing device 14. These mapped platform data sources 48 may be sourced from data uploaded by other users of the other client computing devices 16, both unmapped public data sources 50 and unmapped private data sources 52 from various Internet databases 18, internal databases, etc. In one embodiment, the data mapping module 42 of the electronic data analysis platform program 22 is configured to retrieve a plurality of data sources from private and public databases, which includes the unmapped public data sources 50 and unmapped private data sources 52 of the Internet databases 18. For example, the unmapped public data sources 50 may include census data that is retrieved from government Internet databases, and the unmapped private data sources 52 may include Internet search pattern data that may be retrieved from the private database of a search engine company. A private database refers to a database that is not freely public available (for example a subscription database), whereas a public database is a database that is publicly available (for example a subscription-free database).

After retrieving the plurality of data sources, the data mapping module 42 is configured to map data of each data source of the plurality of data sources to the predetermined data types 44. The data mapping module 42 may map data from the unmapped public data sources 50 and unmapped private data sources 52 to the predetermined data types 44 in the same manner as applied to the one or more user data sources 36. The data mapping module 42 is further configured to store the plurality of mapped data sources from the public and private data sources, as the mapped platform data sources 48. The mapped platform data sources 48 may be utilized in addition to the mapped user data source 46 for the user's data processing goals.

As illustrated in FIG. 1, the electronic data analysis platform program 22 executed on the server device 12 includes a data processing tool module 54 that is configured to store a plurality of modular data processing tools 56, each modular data processing tool 56 configured to perform data processing with predetermined data types 44 and to combine with other modular data processing tools 56 in a data analysis pipeline 58. In one embodiment, each modular data processing tool 56 performs data processing on one or more predetermined data type inputs 60 and generates one or more predetermined data type outputs 62. Thus, as each modular data processing tool 56 is configured to process predetermined data types 44 as input, and generated predetermined data types 44 as output, multiple modular data processing tools 56 may be modularly combined into a data analysis pipeline 58 by matching the predetermined data type outputs 62 of one modular data processing tool 56 with the predetermined data types inputs 60 of another modular data processing tool 56.

Figure 4:
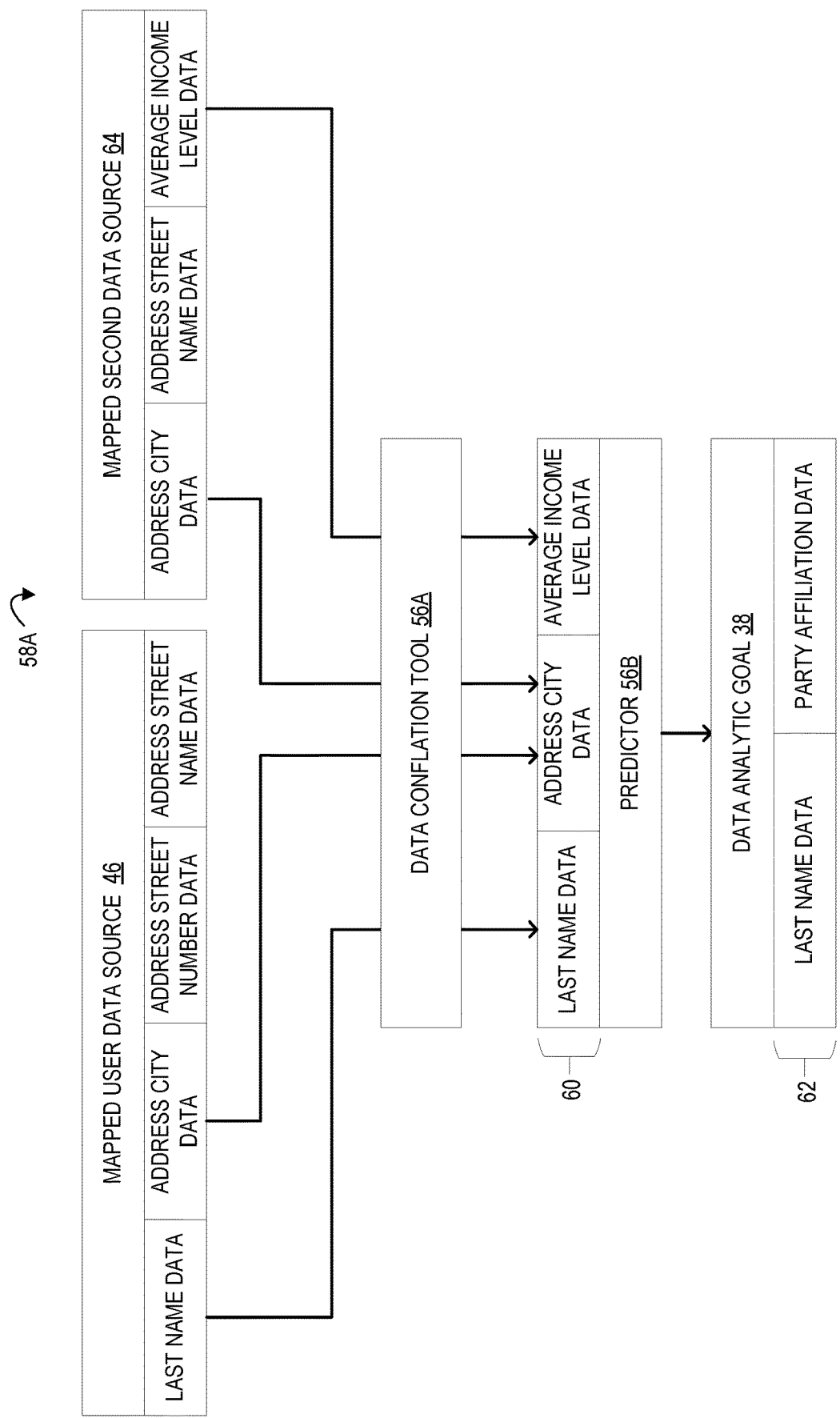
FIG. 4 shows an example data analysis pipeline for the electronic data analysis platform program of FIG. 1.

FIG. 4 illustrates example modular data processing tools 56 configured to process data from the mapped user data source 46 and a mapped second data source 64 to generate a data analytic goal 38. In this example, the mapped second data source 64 may be a second user data source uploaded by the user, or may be selected from the mapped platform data sources 48 to provide additional data not included in the mapped user data source 46. As shown, the modular data processing tool is a predictor 56B, of the type "Party Affiliation Predictor," and is configured to take the predetermined data types Last Name Data, Address City Data, and Average Income Level Data as predetermined data type inputs 60, and output the predetermined data type outputs 62 Last Name Data and Party Affiliation Data as a data analytic goal 38 for the mapped user data source 46. In an alternative use case scenario in which the present system is used to target advertising to prospective purchasers, the predictor 56B may be configured to predict a different characteristic of a user, such as whether a particular user may be likely to purchase a particular product.

Continuing with the party affiliation example, the mapped user data source 46 includes data mapped to the predetermined data types 44 Last Name Data, Address City Data, Address Street Number Data, and Address Street Name Data, but does not include data mapped to the predetermined data type 44 Average Income Level Data, which the predictor 56B from the modular data processing tool 56 requires to generate the data analytic goal 38 of Last Name Data and corresponding Party Affiliation Data. However, the mapped second data source 64 does include Average Income Level Data corresponding to Address City Data/Address Street Name Data. Thus, in this example, the electronic data analysis platform program 22 generates an example data analysis pipeline 58A which includes the mapped user data source 46, the mapped second data source 64, and the predictor 56B.

However, in order to match data from the mapped user data source 46 to data from the mapped second data source 64, a data conflation tool 56A from the modular data processing tools 56 also needs to be added to the example data analysis pipeline 58A. In this example, the predictor 56B requires a person's Last Name Data, their home Address City Data, and their Average Income Level Data, to predict their party affiliation. However, the mapped user data source 46 only includes data for each person's name and location, while the mapped second data source 64 only includes data for the average income level of people living in each location. Thus, in order to match the Average Income Level Data of the mapped second data source 64 to the Last Name data of the mapped user data source 46, the data conflation tool 56A is added to the example data analysis pipeline 58A. In this specific example, the data conflation tool 56A may match a particular person identified by their Last Name Data to a particular Average Income Level Data based on the corresponding Address City Data included in both the mapped user data source 46 and the mapped second data source 64. That is, if the mapped user data source 46 includes a data entry for a person having Last Name Data "Smith", and Address City Data "Seattle", and the mapped second data source 64 includes a data entry for the Address City Data "Seattle" having an Average Income Level Data "$50,000", then the data conflation tool 56A may match the data entry for the person having Last Name Data "Smith" in the mapped user data source 46 to the Average Income Level Data "$50,000" in the mapped second data source 64.

Thus, after processing by the data conflation tool 56A, a person's Last Name Data. Address City Data, and Average Income Level Data may be input into the predictor 56B, which may then generate and output that person's predicted Party Affiliation Data. In this manner, the example data analysis pipeline 58A may be configured to output a predicted Party Affiliation Data corresponding to each person in the Last Name Data of the mapped user data source 46.

It will be appreciated that the generated example data analytic goal 38 which includes Last Name Data and Party Affiliation Data is itself a mapped data source that includes the predetermined data types 44. Thus, the data analytic goal 38 may subsequently be inputted into another modular data processing tool 56 that has predetermined data type inputs 60 of the Last Name Data and Party Affiliation Data. Additionally, the generated data analytic 38 may be stored on the electronic data analysis platform program 22 as a new mapped platform data source 48, and/or may be sent to the client computing device 14 for presentation to the user.

Figure 5:
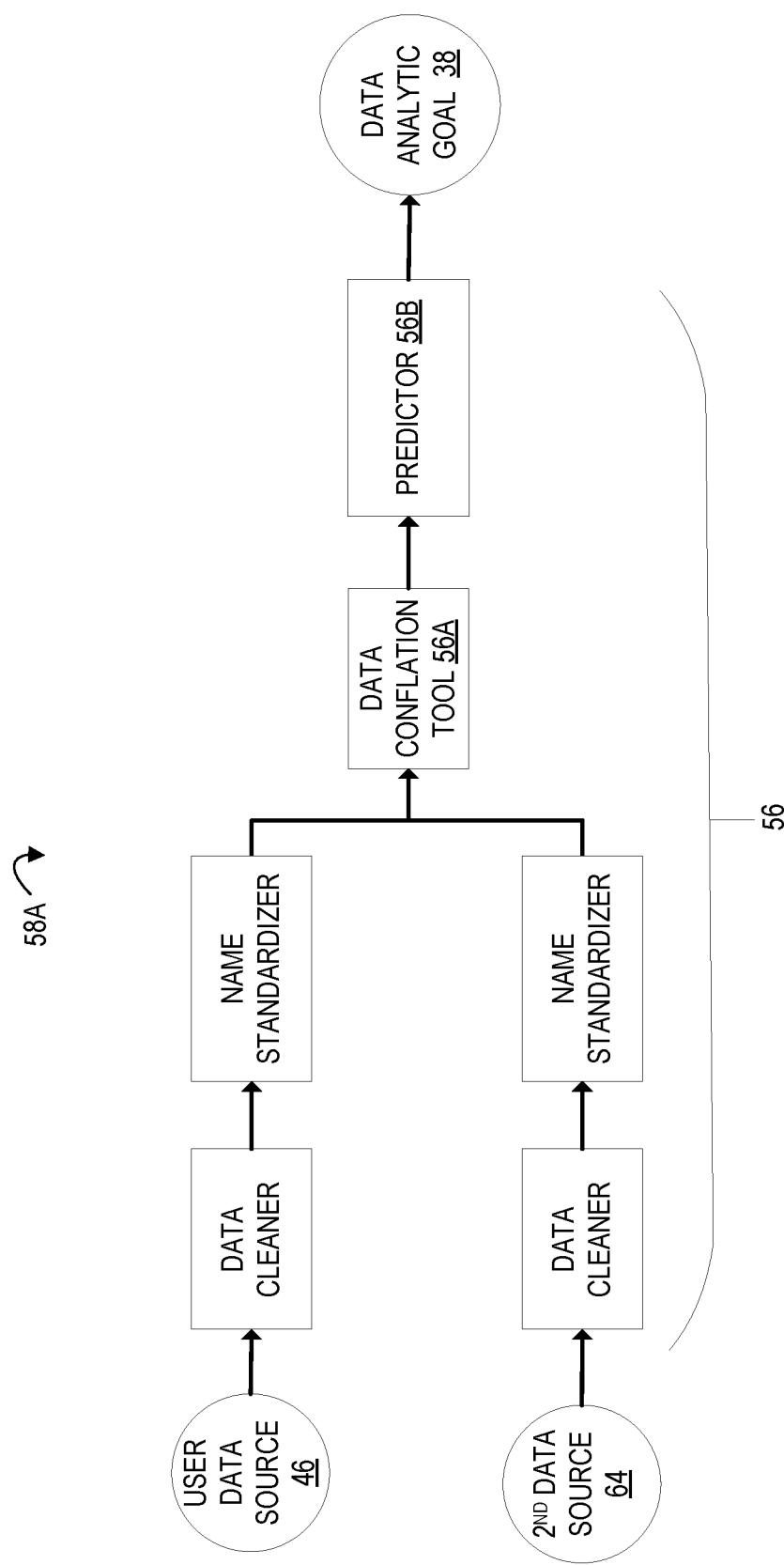
FIG. 5 shows another example data analysis pipeline for the electronic data analysis platform program of FIG. 1.

Turning briefly to FIG. 5, the example data analysis pipeline 58A described in FIG. 4 is illustrated. The example data analysis pipeline 58A includes the mapped one or more user data sources 46, the mapped second data source 64, and a plurality of modular data processing tools 56 including the data conflation tool 56A and predictor 56I described above, that are modularly combined to generate a data analytic goal 38. However, because the mapped one or more user data sources 46 and the mapped second data source 64 may have been generated by different parties, the formatting of the contained data may also be different, and thus prevent data conflation by the data conflation tool 56A. Additionally, depending on the data gathering methods, the data sources may be messy (i.e., not well-structured) and have inconsistences and errors such as duplicated entries, incomplete data, etc. For example, dates may be in different formats, missing years, etc., names may be misspelled, lack capitalization, include nicknames or abbreviations instead of full formal names, and addresses may include misspellings, incomplete data lacking street, road, boulevard designations, lacking geographic indicators such as NW, SW, etc., lacking apartment numbers, etc. Thus, the electronic data analysis platform program 22 may also select a data cleaner and a name standardizer modular data analysis tool to be added to the example data analysis pipeline 58A in order to standardize formatting and clean any messy data before being input into the data conflation tool 56A. It will be appreciated that these specific examples are merely illustrative, and that other modular data processing tools 56, data sources, data analytic goals, and data analysis pipelines specifically not discussed above may also be utilized. Additionally, it will be appreciated that a data analysis pipeline may include any suitable number of mapped data sources and modular data processing tools.

Turning back to FIG. 1, after receiving the one or more user data sources, the electronic data analysis platform program 22 is configured to determine a data analytic goal 38 for the mapped one or more user data sources 46. In one embodiment, the data analytic goal 38 comprises one or more predetermined data types 44 that are generated and output by a data analysis pipeline 58 including one or more modular data processing tools 56. In this embodiment, the user input 34 further includes the data analytic goal 38 for the mapped one or more user data sources 46. Further in this embodiment, the client electronic data analysis platform program 26 may be configured to determine a data analytic goal 38 for the mapped one or more user data sources 46 via the user input 34, and send the data analytic goal to the server device 12.

Figure 6:
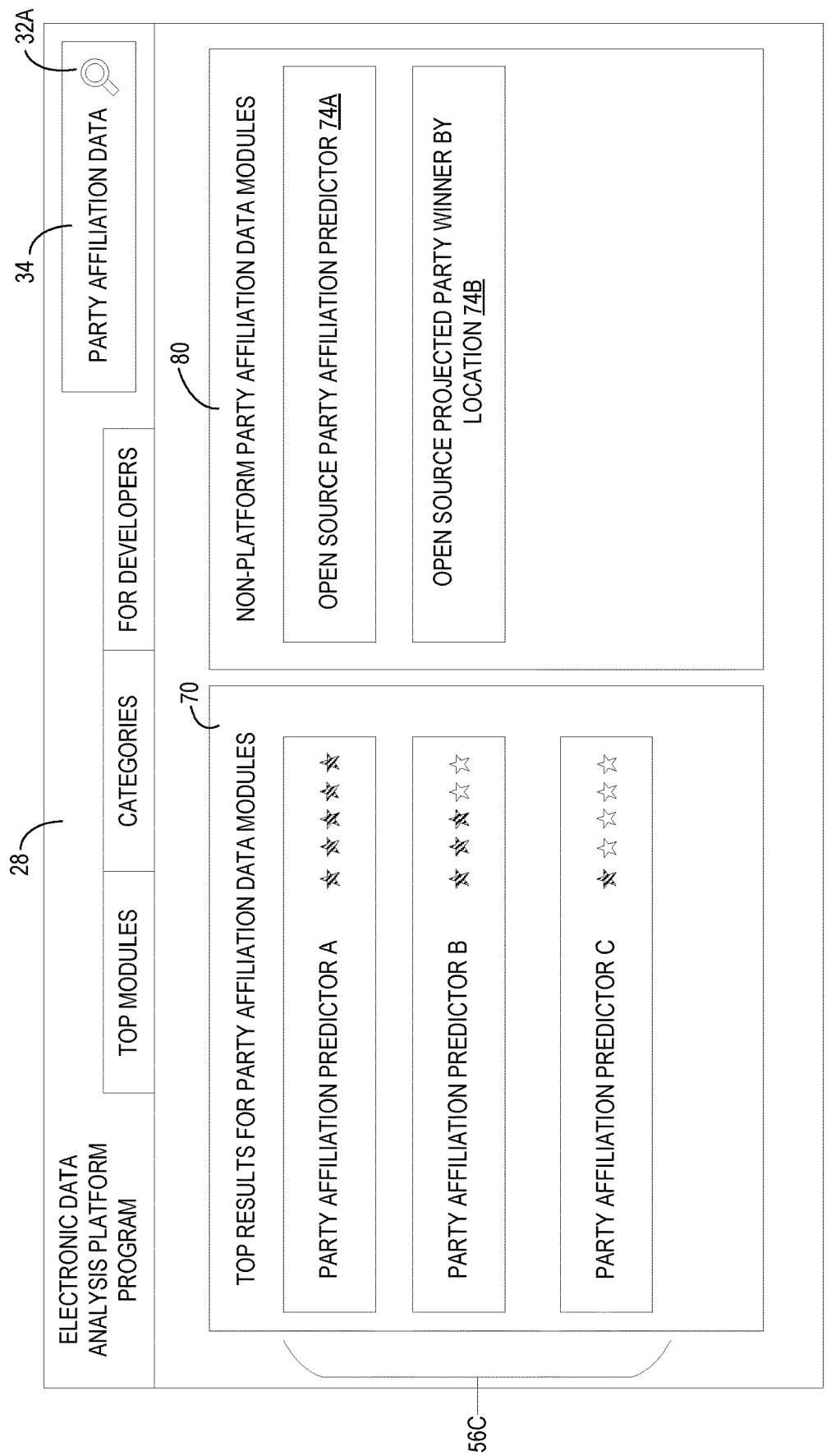
FIG. 6 shows another example client electronic data analysis platform program graphical user interface for the computing system of FIG. 1.

Turning briefly to FIG. 6, the example client electronic data analysis platform program GUI 28 includes a GUI element 32A configured to receive a user input 34 of a data analytic goal 38. In the illustrated example, the user has entered a user input 34A of "party affiliation data" into the GUI element 32A. The client electronic data analysis platform program sends the user input 34A to the electronic data analysis platform program 22 executed on the server device 12. It will be appreciated that this specific example is merely illustrative, and that other input methods specifically not discussed above may also be utilized to enter the data analytic goal 38, such as a selection input to a drop down menu, a speech input, etc.

In another embodiment, the electronic data analysis platform program 22 is configured to determine the data analytic goal 38 based on the one or more predetermined data types 44 mapped to data of the mapped one or more user data sources 46. For example, if the mapped user data source 46 includes data mapped to the predetermined data types Last Name Data, Address City Data, and Average Income Level Data, then the electronic data analysis platform program may determine that Party Affiliation Data may be mined from the mapped user data source 46 using the predictor 56B from the modular data processing tools 56 stored by the data processing tool module 54. Thus, in this specific embodiment, the electronic data analysis platform program may be configured to determine the data analytic goal 38 to be Party Affiliation Data, and generate a data analysis pipeline module 30 accordingly.

Further in this embodiment, to determine the data analytic goal 38, the electronic data analysis platform program 22 is further configured to determine a plurality of modular data processing tools 56 that are configured to process the one or more predetermined data types 44 mapped to data of the mapped one or more user data sources 46 to generate a plurality of data analytic goals 38. In the above example where the mapped user data source 46 includes data mapped to the predetermined data types Last Name Data, Address City Data, and Average Income Level Data, the electronic data analysis platform program 22 may determine that a plurality of modular data processing tools 56 are configured to process the predetermined data types Last Name Data, Address City Data, and Average Income Level Data, to generate different data analytic goals. For example, in addition to the predictor 56B, an affluence heat mapper tool may be configured to process the same predetermined data types to generate heat map data that visually shows the most affluent geolocations contained in the mapped user data source 46.

Figure 7:
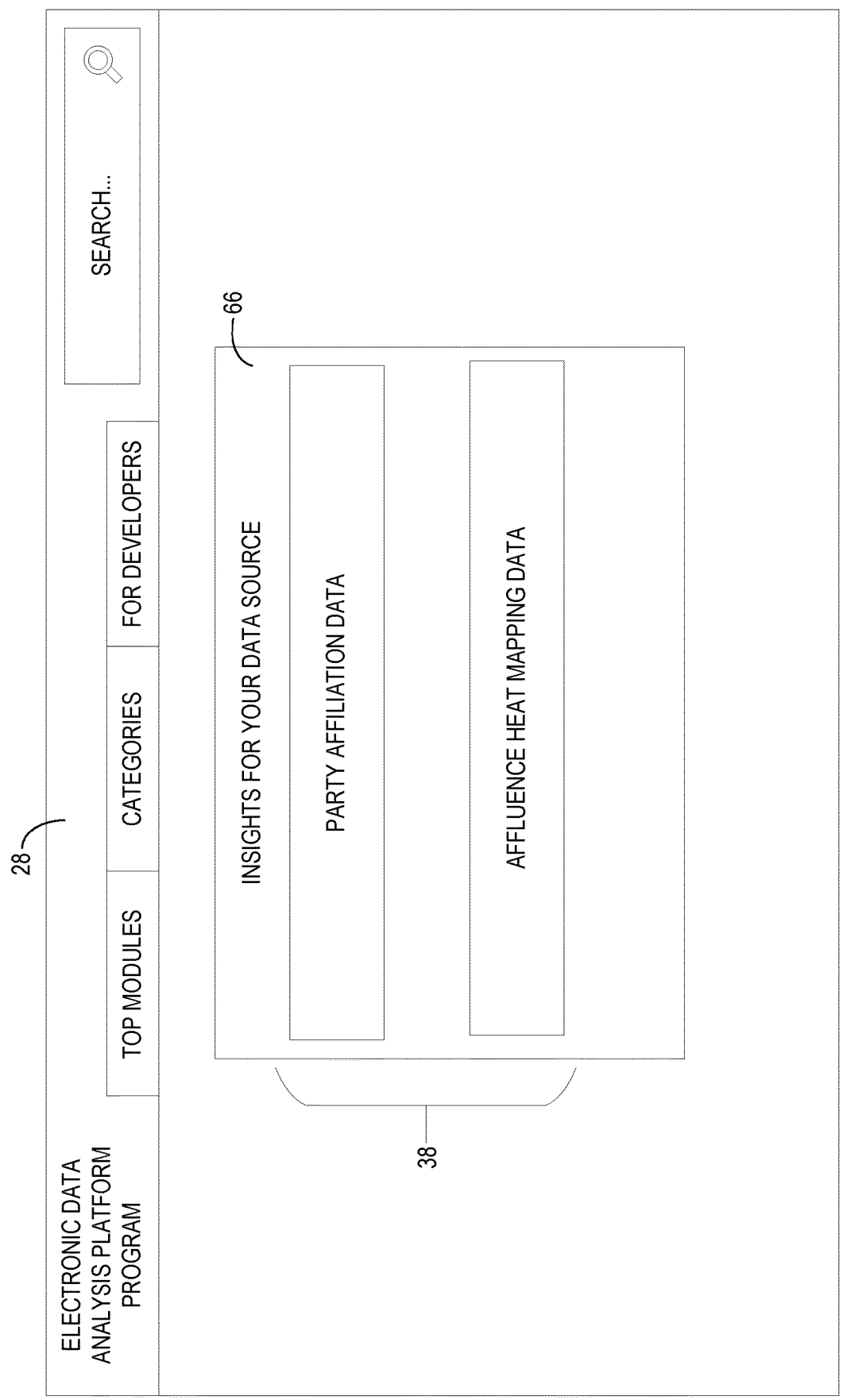
FIG. 7 shows another example client electronic data analysis platform program graphical user interface for the computing system of FIG. 1.

Thus, in this embodiment, the electronic data analysis platform program 22 is configured to present a list 66 of the plurality of data analytic goals 38 generated by the plurality of modular data processing tools 56 to the user as shown in the example client electronic data analysis platform program GUI 28 of FIG. 7. To present the list 66, the electronic data analysis platform program 22 may be configured to send GUI data to the client electronic data analysis platform program executed on the client computing device 14 to cause the client computing device 14 to display the list 66 on the client electronic data analysis platform program GUI 28. Next, the electronic data analysis platform program 22 is configured to receive a user selection of the data analytic goal from the list 66 of the plurality of data analytic goals 38. In the illustrated example, the user may click on GUI elements included in the list 66 of the plurality of data analytic goals 38, and thus enter a selection input 40 of a specific data analytic goal that is configured to be sent to the electronic data analysis platform program 22 executed by the server device 12.

Turning back FIG. 1, the electronic data analysis platform program 22 includes a data analysis pipeline module 68 configured to select one or more modular data processing tools 56 configured to process the one or more predetermined data types 44 mapped to data of the mapped one or more user data sources 46 to generate the data analytic goal 38. For example, if the data analytic goal 38 is Party Affiliation Data, then the data analysis pipeline module 68 may select a modular data processing tool 56 configured take one or more of the predetermined data types mapped to data of the mapped user data source 46 as predetermined data type inputs 60, and generate the data analytic goal 38 as the predetermined data type outputs 62. In the specific example illustrated in FIGS. 4 and 5, the data analysis pipeline module 68 selected a party affiliation predictor as a predictor 56B from the modular data processing tools 56. Alternatively, in a targeted advertising scenario, the predictor may be configured to predict a person's likelihood of purchasing a particular product, for example.

In some cases, there may be a plurality of modular data processing tools 56 that are configured to process the data of the mapped user data source 46 to generate the data analytic goal 38. In one embodiment, the data analysis pipeline module 68 may be configured to select a modular data processing tool having a highest rating or ranking, which may be generated over time via input from users of the other client computing devices 16. In another embodiment, the data analysis pipeline module 68 is configured to determine a plurality of modular data processing tools 56C that are configured to process the one or more predetermined data types 44 mapped to data of the mapped one or more user data sources 46 to generate the data analytic goal 38, and present the user with a ranked list 70 of the plurality of modular data processing tools 56C as shown in the example client electronic data analysis platform program GUI 28 of FIG. 6. Utilizing the client electronic data analysis platform program GUI 28, the user may enter a selection input of one of the modular data processing tools 56C. Next, the data analysis pipeline module 68 of the electronic data analysis platform program executed on the server device 12 is configured to receive a user selection of the modular data processing tool 56 from the ranked list 70.

As shown in FIG. 1, the data analysis pipeline module 68 is configured to generate a data analysis pipeline 58 configured to generate the data analytic goal 38, the data analysis pipeline 58 including the mapped one or more user data sources 46 and the one or more modular data processing tools 56, and process the mapped one or more user data sources 46 with the data analysis pipeline 58 to generate the data analytic goal 38. In one embodiment, the data analysis pipeline module 68 may send the data analysis pipeline 58 and the generated data analytic goal to the client electronic data analysis platform program 26 executed on the client computing device to cause the data analysis pipeline 58 and the generated data analytic goal to be presented to the user via the client electronic data analysis platform program GUI 28 displayed on display 30.

In another embodiment, the client computing device 14 may be configured to perform the data processing with the data analysis pipeline 58. In this embodiment, the client electronic analysis platform program 26 executed on the client computing device 14 is configured to receive, from the server device 12, one or more modular data processing tools 56 configured to process the one or more predetermined data types 44 mapped to data of the mapped one or more user data sources 46 to generate the data analytic goal 38, each modular data processing tool 56 configured to perform data processing with the predetermined data types 44 and to combine with other modular data processing tools 56 in a data analysis pipeline 58. Along with the one or more modular data processing tools, the client computing device 14 may also receive the data analysis pipeline 58 which includes the one or more modular data processing tools. Further in this embodiment, the client computing device 14 is configured to present, to a user of the client computing device 14, a data analysis pipeline 58 configured to generate the data analytic goal 38, the data analysis pipeline including the mapped one or more user data sources and the one or more modular data processing tools. The data analysis pipeline 58 may be presented to the user via the client electronic data analysis platform program GUI 28 displayed on the display 30 of the client computing device 14. In this embodiment, the client computing device 14 is configured to process the mapped one or more user data sources 46 with the data analysis pipeline 58 to generate the data analytic goal 38.

As discussed in the example illustrated in FIG. 4, the selected one or more modular data processing tools may require data of predetermined data types that are not included in the mapped user data source 46 in order to generate the data analytic goal 38. Thus, in one embodiment, the electronic data analysis platform program 22 is further configured to determine whether the one or more modular data processing tools 56 require a second predetermined data type 44 that was not mapped to data of the mapped one or more user data sources 46 to generate the data analytic goal 38. In the specific example illustrated in FIG. 4, the selected modular data processing tool 56, which is predictor 56B for party affiliation, requires the predetermined data type 44 of Average Income Level Data, which is was not mapped to data of the mapped user data source 46. Accordingly, the mapped user data source 46 needs to be supplemented with another mapped data source that includes the Average Income Level Data predetermined data type, and can be conflated with the data of the mapped user data source 46.

Accordingly, in this embodiment, if the one or more modular data processing tools require the second predetermined data type, the electronic data analysis platform program 22 is further configured to select a second mapped data source 64 from the plurality of mapped data sources that includes data mapped to the second predetermined data type, and add the second mapped data source 64 to the data analysis pipeline 58. It will be appreciated that the data analysis pipeline 58 is not limited to one or two mapped data sources, and may include any suitable number of mapped data sources.

In one embodiment, the electronic data analysis platform program 22 is further configured to store the generated data analysis pipeline 58 configured to generate the data analytic goal 38. The generated data analysis pipeline 58 may be stored on the server device by the data analysis pipeline module 68. The stored data analysis pipeline 58 may be sent to the other client computing devices 16 to cause the client electronic data analysis platform programs executed on each client computing device to present the generated data analysis pipeline 58 to other users of the electronic data analysis platform program 22.

As shown in FIG. 2, the electronic data analysis platform program 22 may be further configured to programmatically annotate the generated data analysis pipeline 58 with a description 72 of the one or more modular data processing tools 56 and the data analytic goal 38. In the illustrated example, the description 72 includes a descriptive title of the generated data analysis pipeline 58 and the names of each modular data processing tool included in the generated data analysis pipeline 58. The description 72 is presented to the user via the client electronic data analysis platform program GUI 28, and each user of the client computing device 14 and other client computing devices 16 may access the generated data analysis pipeline 58 via the client electronic data analysis platform program GUI 28. It will be appreciated that the description 72 may include any other suitable information, such as the name of the user, a packaged price for the pipeline, etc.

Turning briefly back to FIG. 1, the data processing tool module 54 of the electronic data analysis platform program 22 may be further configured to search an Internet database 18 for a plurality of non-platform data processing tools 74 not stored on the electronic data analysis platform program 22. The Internet database includes public databases accessible via the World Wide Web, such as websites that provide open source modules relating to data processing. The Internet database may also include the user's own private database, such as an internal company database that the electronic data analysis platform program 22 has been given permission to access by the user.

Figure 8:
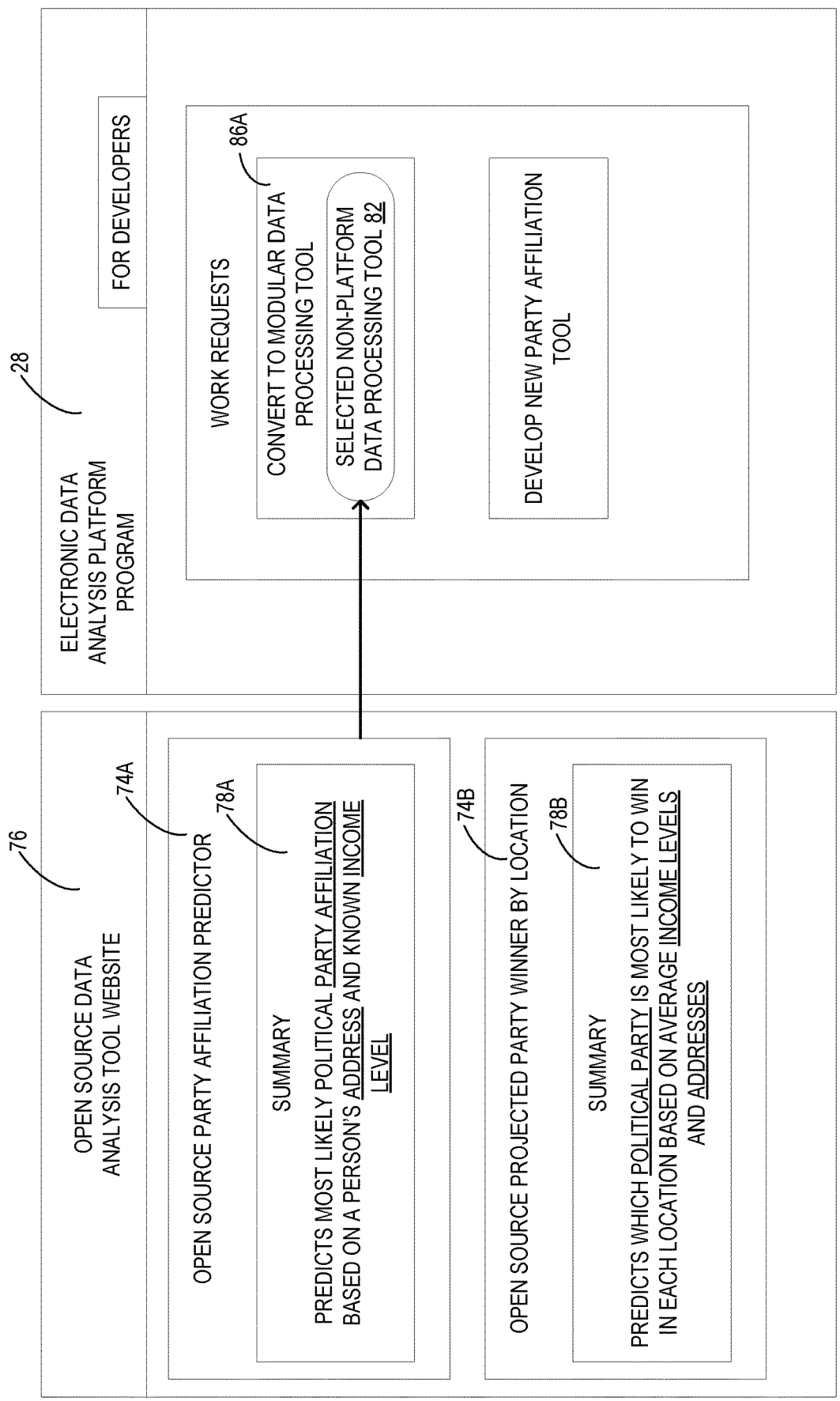
FIG. 8 shows another example client electronic data analysis platform program graphical user interface for the computing system of FIG. 1.

FIG. 8 illustrates an example Internet database 18 that the electronic data analysis platform program 22 has accessed via a website 76 for the Internet database. While searching the Internet database 18, the electronic data analysis platform program 22 is configured to process a summary 78 for each of the plurality of non-platform data processing tools 74 to determine one or more non-platform data processing tools 74 configured to generate the data analytic goal 38. The summary may take the form of any suitable written description of the non-platform data processing tool that is machine readable. To process the summary 78, the electronic data analysis platform program 22 may search for keywords related to the data analytic goal 38. In the specific example of FIG. 8, the data analysis goal 38 is the predetermined data type Party Affiliation Data. Thus, the electronic data analysis platform program 22 processes the summary 78 of each searchable non-platform data processing tool in the Internet database 18 for keywords relating to "Party Affiliation Data". In the illustrated example, the electronic data analysis platform program 22 finds two non-platform data processing tools 74A and 74B that have summaries 78A and 78B that include the keywords "Party Affiliation" and "Political Party", which are related to the data analysis goal of Party Affiliation Data.

In one embodiment, the electronic data analysis platform program 22 also processes the summary 78 for keywords related to the one or more predetermined data types mapped to data of the mapped user data source 46. In the illustrated example, the electronic data analysis platform program 22 determines that the summaries 78A and 78B for the non-platform data analysis tools 74A and 74B include the keywords "Address", and "Income Level", which are closely related to the one or more predetermined data types mapped to the example mapped user data source of FIG. 3.

After determining one or more non-platform data processing tools 74 configured to generate the data analytic goal 38, the electronic data analysis platform program 22 is further configured to present the one or more non-platform data processing tools 74 to the user. Turning back to FIG. 6, the electronic data analysis platform program 22 may present the one or more non-platform data processing tools 74 to the user via the client electronic data analysis platform program GUI 28. In the illustrated example, the client electronic data analysis platform program GUI 28 presents the non-platform data analysis tools determined in the example of FIG. 8 to the user in a list GUI element 80 alongside the ranked list 70 of modular data processing tools 56C. Thus, the user may be presented with applicable data processing tools from sourced from both the electronic data analysis platform program 22 itself and non-platform data processing tools 74 accessible via Internet databases 18. The user may then select a particular data processing tool via the GUI elements of the client electronic data analysis platform program 28, either a modular data processing tool 56 or a non-platform data processing tool 74, based on which data processing tool is suitable for the user's data processing goals.

In one embodiment, the electronic data analysis platform program 22 is configured to receive a user selection of a non-platform data processing tool from the one or more non-platform data processing tools 74 presented to the user, via the client electronic data analysis platform program 26. It will be appreciated that the non-platform data processing tools 74 sourced from Internet databases 18 are not necessarily directly compatible with the modular data processing tools stored on the electronic data analysis platform program 22. For example, the non-platform data processing tools 74 are not likely to be designed to specifically process the predetermined data types 44 of the electronic data analysis platform program 22. Thus, in order to be integrated into the electronic data analysis platform program 22, the selected non-platform data processing tool 82 will typically undergo software development to adjust the selected non-platform data processing tool 82 to be configured to process suitable predetermined data types 44, and be modularly compatible with the modular data processing tools 56.

In one embodiment, to facilitate this software development of non-platform data processing tools, a work request module 84 of the electronic data analysis platform program 22 is configured to programmatically generate an advertisement 86 for a work request 88 to convert the selected non-platform data processing tool 82 to a new modular data processing tool 56 configured to perform data processing on the predetermined data types 44 to generate the data analytic goal 38, and present the advertisement 86 for the work request 88 on the electronic data analysis platform program 22. FIG. 8 illustrates an example advertisement 86A for a work request 88 to convert the example non-platform data processing tool 74A to a new modular data processing tool. The example advertisement 86A is presented to users via client electronic data analysis platform program GUIs displayed by the other client computing devices 16. These other users may be freelance software developers that accept work requests 88 via the client electronic data analysis platform program 26 executed by their own client computing device. It will be appreciated that the advertisement 86 may include any suitable information, such as a software development budget, a description of the selected non-platform data processing tool 82, the data analysis pipeline 58 into which the selected non-platform data processing tool 82 will be integrated, etc. After conversion, the new modular data processing tool may be uploaded by the freelancer's client electronic data analysis platform program to the electronic data analysis platform program 22 executed by the server device 12 and stored by the data processing tool module 54. The new modular data processing tool may then be added to the data analysis pipeline 58 of the user that initiated the work request 88.

Figure 9:
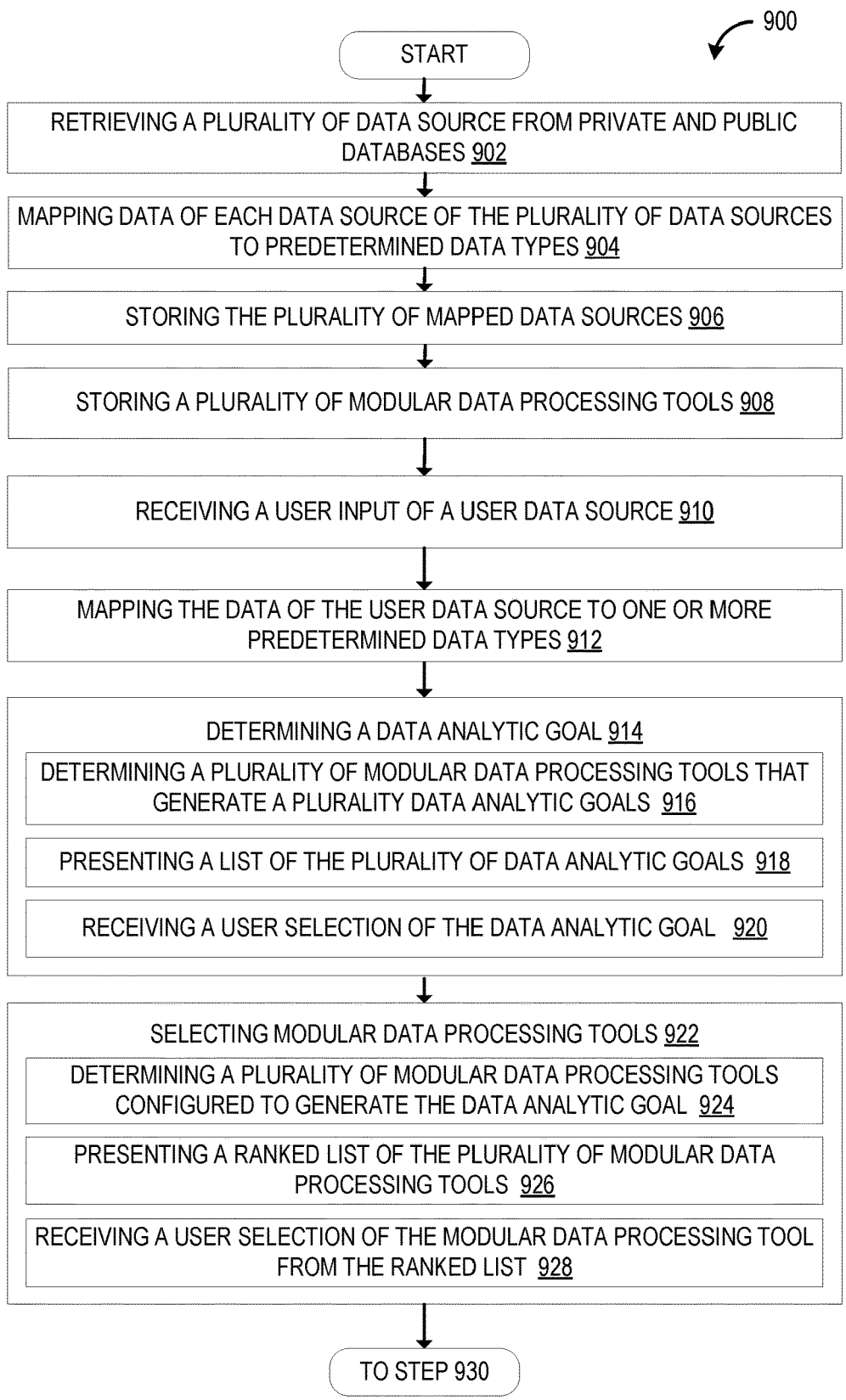
FIG. 9 shows an example method for an electronic data analysis platform program using the computing system of FIG. 1.
Figure 10:
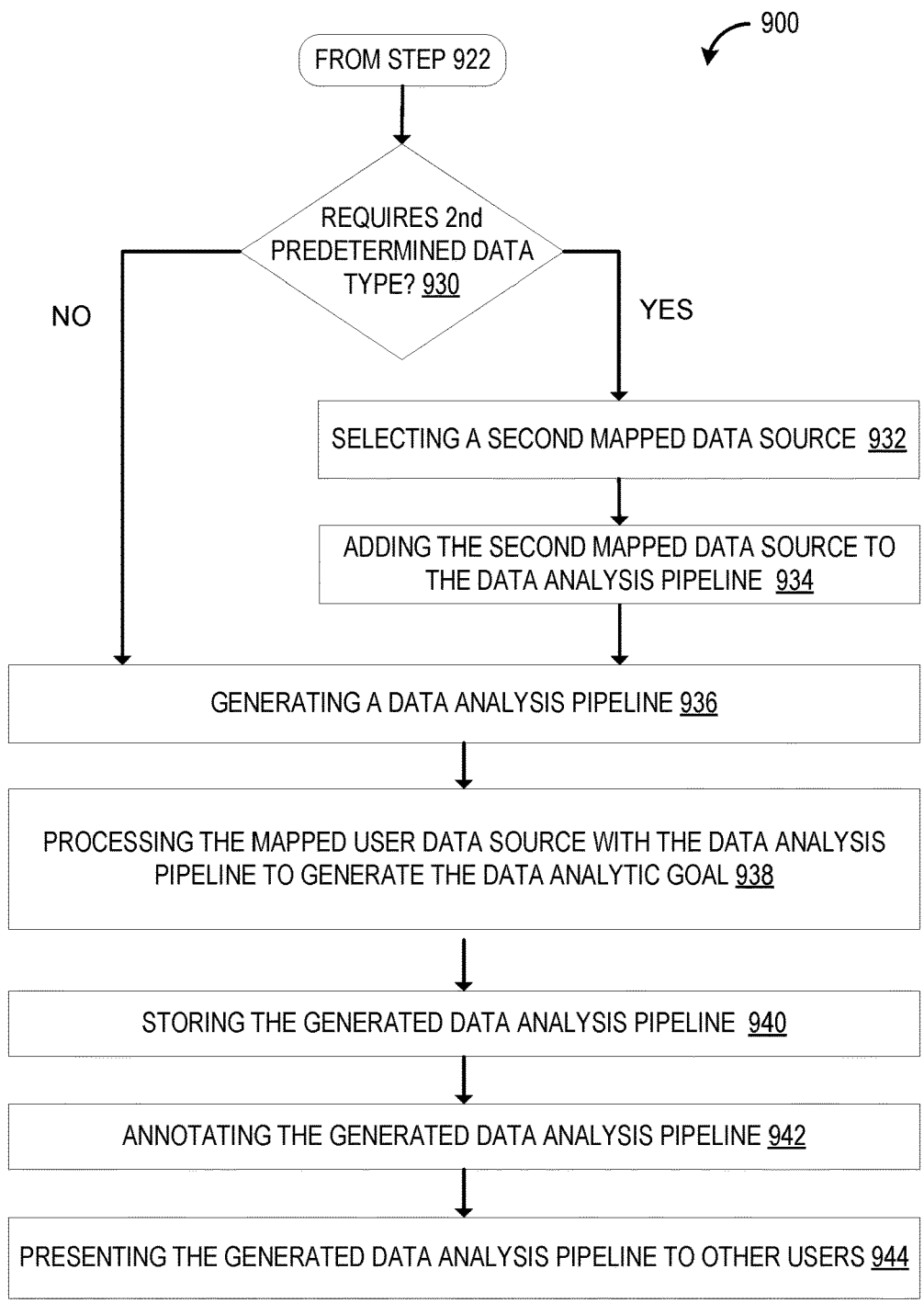
FIG. 10 continues the example method of FIG. 9.

FIGS. 9 and 10 shows an example method 900 according to an embodiment of the present description. At step 902, the method 900 may include retrieving a plurality of data sources from private and public databases. The private and public databases may include Internet databases, internal databases, government databases, etc. Advancing from step 902 to step 904, the method 900 may include mapping data of each data source of the plurality of data sources to the predetermined data types. Proceeding from step 904 to step 906, the method 900 may include storing the plurality of mapped data sources.

Advancing from step 906 to step 908, the method 900 may include storing a plurality of modular data processing tools, each modular data processing tool configured to perform data processing with predetermined data types and to combine with other modular data processing tools in a data analysis pipeline. Proceeding from step 908 to step 910, the method 900 may include receiving a user input of one or more user data sources, the one or more user data sources including data of undetermined data types. Advancing from step 910 to step 912, the method 900 may include mapping the data of the one or more user data sources to one or more of the predetermined data types.

Proceeding from step 912 to step 914, the method 900 may include determining a data analytic goal for the mapped one or more user data sources. In one embodiment, the user input further includes the data analytic goal for the mapped one or more user data sources. In another embodiment, the data analytic goal is determined based on the one or more predetermined data types mapped to data of the mapped one or more user data sources. In this embodiment, step 914 may include substeps 916-920 to determine the data analytic goal. Advancing from step 914 to substep 916, the method 900 may include determining a plurality of modular data processing tools that are configured to process the one or more predetermined data types mapped to data of the mapped one or more user data sources to generate a plurality of data analytic goals. Proceeding from substep 916 to substep 918, the method 900 may include presenting a list of the plurality of data analytic goals generated by the plurality of modular data processing tools to the user. Advancing from substep 918 to substep 920, the method 900 may include receiving a user selection of the data analytic goal from the list of the plurality of data analytic goals.

Proceeding from step 914 to step 922, the method 900 may include selecting one or more modular data processing tools configured to process the one or more predetermined data types mapped to data of the mapped one or more user data sources to generate the data analytic goal. In one embodiment, step 922 includes substeps 924-928. Advancing from step 922 to substep 924, the method 900 may include determining a plurality of modular data processing tools that are configured to process the one or more predetermined data types mapped to data of the mapped one or more user data sources to generate the data analytic goal. Proceeding from substep 924 to substep 926, the method 900 may include presenting the user with a ranked list of the plurality of modular data processing tools. Advancing from substep 926 to substep 928, the method 900 may include receiving a user selection of the modular data processing tool from the ranked list.

Proceeding from step 922 to step 930, the method 900 may include determining whether the one or more modular data processing tools require a second predetermined data type that was not mapped to data of the mapped one or more user data sources to generate the data analytic goal. If the one or more modular data processing tools require the second predetermined data type, the method 900 advances from step 930 to step 932 and may include selecting a second mapped data source from the plurality of mapped data sources that includes data mapped to the second predetermined data type. Proceeding from step 932 to step 934, the method 900 may include adding the second mapped data source to the data analysis pipeline. Advancing from step 934 to step 936, the method 900 may include generating a data analysis pipeline configured to generate the data analytic goal, the data analysis pipeline including the mapped one or more user data sources and the one or more modular data processing tools. On the other hand, if the one or more modular data processing tools do not require the second predetermined data type, the method 900 proceeds directly from step 930 to step 936.

Advancing from step 936 to step 938, the method 900 may include processing the mapped one or more user data sources with the data analysis pipeline to generate the data analytic goal. Proceeding from step 938 to stop 940, the method 900 may include storing the generated data analysis pipeline configured to generate the data analytic goal. Advancing from step 940 to step 942, the method 900 may include annotating the generated data analysis pipeline with a description of the one or more modular data processing tools and the data analytic goal. Proceeding from step 942 to step 944, the method 900 may include presenting the generated data analysis pipeline to other users.

Figure 11:
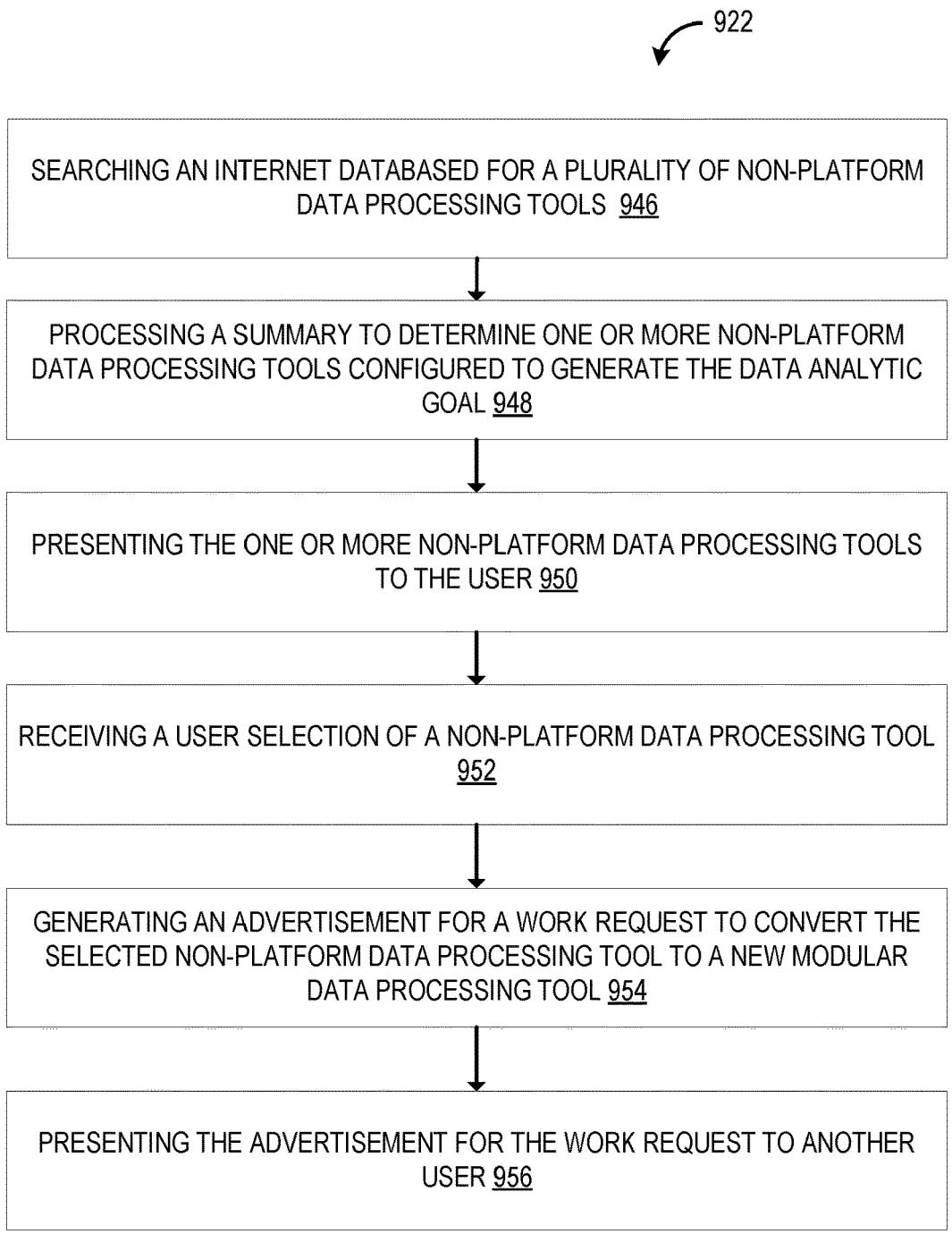
FIG. 11 continues the example method of FIG. 9.

FIG. 11 shows another embodiment of step 922, which may occur additionally or optionally to the embodiments of step 922 discussed above. In this embodiment, step 922 includes substeps 946-956. Proceeding to substep 946, the method 900 may include searching an Internet database for a plurality of non-platform data processing tools. Advancing from substep 946 to substep 948, the method 900 may include processing a summary for each of the plurality of non-platform data processing tools to determine one or more non-platform data processing tools configured to generate the data analytic goal. Proceeding from substep 948 to substep 950, the method 900 may include presenting the one or more non-platform data processing tools to the user.

Advancing from substep 950 to substep 952, the method 900 may include receiving a user selection of a non-platform data processing tool from the one or more non-platform data processing tools presented to the user. Proceeding from substep 952 to substep 954, the method 900 may include generating an advertisement for a work request to convert the selected non-platform data processing tool to a new modular data processing tool configured to perform data processing on the predetermined data types to generate the data analytic goal. Advancing from substep 954 to substep 956, the method 900 may include presenting the advertisement for the work request to another user. After the selected non-platform data processing tool has been converted into the new modular data processing tool, the new modular data processing tool may be selected during step 922 and added to the data analysis pipeline according to the method discussed above.

It will be appreciated that the method steps described above may be performed using the algorithmic processes described throughout this disclosure, including in the description of the computing system 10 above.

In some embodiments, the methods and processes described herein may be tied to a computing system of one or more computing devices. In particular, such methods and processes may be implemented as a computer-application program or service, an application-programming interface (API), a library, and/or other computer-program product.

Figure 12:
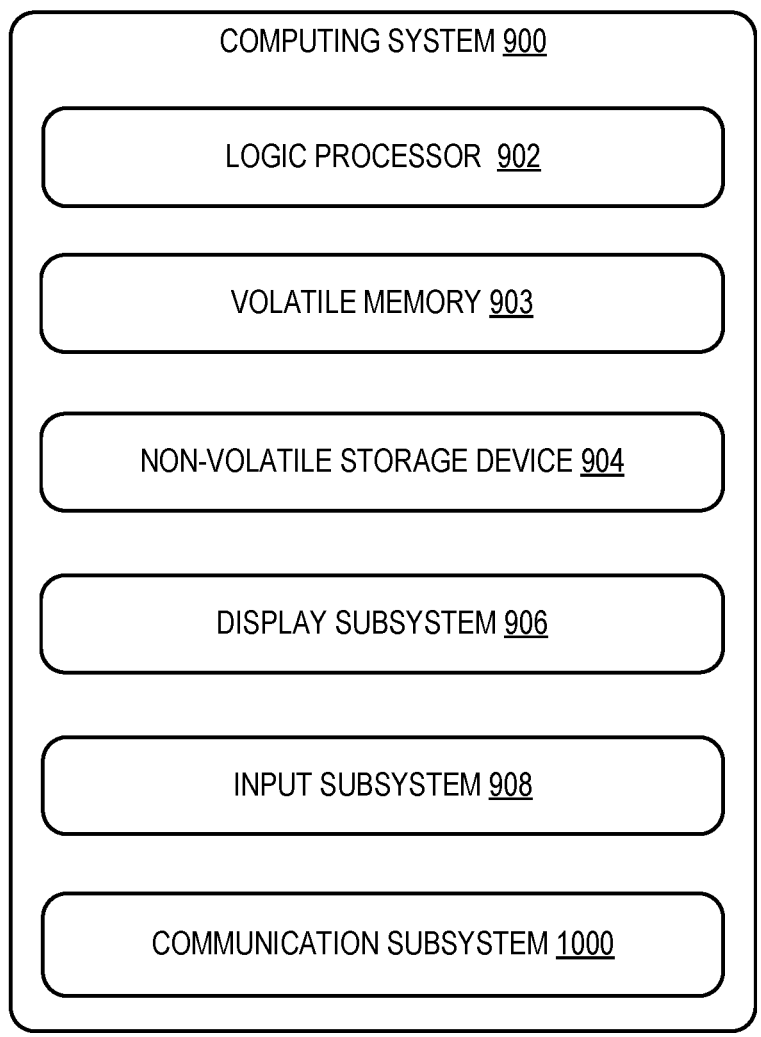
FIG. 12 shows an example computing system according to an embodiment of the present description.

FIG. 12 schematically shows a non-limiting embodiment of a computing system 900 that can enact one or more of the methods and processes described above. Computing system 900 is shown in simplified form. Computing system 900 may embody one or more server device 12 or client computing device 14 or other client computing devices 16 of FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 903, and a non-volatile storage device 904. Computing system 900 may optionally include a display subsystem 906, input subsystem 908, communication subsystem 1000, and/or other components not shown in FIG. 12.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 904 includes one or more physical devices configured to hold instructions executable by the logic processors to implement the methods and processes described herein. When such methods and processes are implemented, the state of non-volatile storage device 94 may be transformed—e.g., to hold different data.

Non-volatile storage device 904 may include physical devices that are removable and/or built-in. Non-volatile storage device 94 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 904 may include nonvolatile, dynamic, static, read/write, read-only, sequential-access, location-addressable, file-addressable, and/or content-addressable devices. It will be appreciated that non-volatile storage device 904 is configured to hold instructions even when power is cut to the non-volatile storage device 904.

Volatile memory 903 may include physical devices that include random access memory. Volatile memory 903 is typically utilized by logic processor 902 to temporarily store information during processing of software instructions. It will be appreciated that volatile memory 903 typically does not continue to store instructions when power is cut to the volatile memory 903.

Aspects of logic processor 902, volatile memory 903, and non-volatile storage device 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 904, using portions of volatile memory 903. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by non-volatile storage device 904. The visual representation may take the form of a graphical user interface (GUI). As the herein described methods and processes change the data held by the non-volatile storage device, and thus transform the state of the non-volatile storage device, the state of display subsystem 906 may likewise be transformed to visually represent changes in the underlying data. Display subsystem 906 may include one or more display devices utilizing virtually any type of technology. Such display devices may be combined with logic processor 902, volatile memory 903, and/or non-volatile storage device 904 in a shared enclosure, or such display devices may be peripheral display devices.

When included, input subsystem 908 may comprise or interface with one or more user-input devices such as a keyboard, mouse, touch screen, microphone, camera, or game controller.

When included, communication subsystem 1000 may be configured to communicatively couple various computing devices described herein with each other, and with other devices. Communication subsystem 1000 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

The following paragraphs provide additional support for the claims of the subject application. One aspect provides a server device comprising: a processor, and an electronic data analysis platform program executed by the processor, the electronic data analysis platform program configured to: store a plurality of modular data processing tools, each modular data processing tool configured to perform data processing with predetermined data types and to combine with other modular data processing tools in a data analysis pipeline, receive a user input of one or more user data sources, the one or more user data sources including data of undetermined data types, map the data of the one or more user data sources to one or more of the predetermined data types, determine a data analytic goal for the mapped one or more user data sources, select one or more modular data processing tools configured to process the one or more predetermined data types mapped to data of the mapped one or more user data sources to generate the data analytic goal, generate a data analysis pipeline configured to generate the data analytic goal, the data analysis pipeline including the mapped one or more user data sources and the one or more modular data processing tools, and process the mapped one or more user data sources with the data analysis pipeline to generate the data analytic goal. In this aspect, the server device may additionally or alternatively include, wherein the electronic data analysis platform program is further configured to: retrieve a plurality of data sources from private and public databases, map data of each data source of the plurality of data sources to the predetermined data types, store the plurality of mapped data sources, determine whether the one or more modular data processing tools require a second predetermined data type that was not mapped to data of the mapped one or more user data sources to generate the data analytic goal, if the one or more modular data processing tools require the second predetermined data type: select a second mapped data source from the plurality of mapped data sources that includes data mapped to the second predetermined data type, and add the second mapped data source to the data analysis pipeline. In this aspect, the server device may additionally or alternatively include, wherein the user input further includes the data analytic goal for the mapped one or more user data sources. In this aspect, the server device may additionally or alternatively include, wherein the electronic data analysis platform program is configured to determine the data analytic goal based on the one or more predetermined data types mapped to data of the mapped one or more user data sources. In this aspect, the server device may additionally or alternatively include, wherein to determine the data analytic goal, the electronic data analysis platform program is further configured to: determine a plurality of modular data processing tools that are configured to process the one or more predetermined data types mapped to data of the mapped one or more user data sources to generate a plurality of data analytic goals, present a list of the plurality of data analytic goals generated by the plurality of modular data processing tools to the user, and receive a user selection of the data analytic goal from the list of the plurality of data analytic goals. In this aspect, the server device may additionally or alternatively include, wherein the electronic data analysis platform program is further configured to: search an Internet database for a plurality of non-platform data processing tools not stored on the electronic data analysis platform program, process a summary for each of the plurality of non-platform data processing tools to determine one or more non-platform data processing tools configured to generate the data analytic goal, and present the one or more non-platform data processing tools to the user. In this aspect, the server device may additionally or alternatively include, wherein the electronic data analysis platform program is further configured to: receive a user selection of a non-platform data processing tool from the one or more non-platform data processing tools presented to the user, generate an advertisement for a work request to convert the selected non-platform data processing tool to a new modular data processing tool configured to perform data processing on the predetermined data types to generate the data analytic goal, and present the advertisement for the work request on the electronic data analysis platform program. In this aspect, the server device may additionally or alternatively include, wherein to select a modular data processing tool, the electronic data analysis platform program is further configured to: determine a plurality of modular data processing tools that are configured to process the one or more predetermined data types mapped to data of the mapped one or more user data sources to generate the data analytic goal, present the user with a ranked list of the plurality of modular data processing tools, and receive a user selection of the modular data processing tool from the ranked list. In this aspect, the server device may additionally or alternatively include, wherein the electronic data analysis platform program is further configured to: store the generated data analysis pipeline configured to generate the data analytic goal, annotate the generated data analysis pipeline with a description of the one or more modular data processing tools and the data analytic goal, and present the generated data analysis pipeline to other users of the electronic data analysis platform program.

Another aspect provides a method comprising: storing a plurality of modular data processing tools, each modular data processing tool configured to perform data processing with predetermined data types and to combine with other modular data processing tools in a data analysis pipeline, receiving a user input of one or more user data sources, the one or more user data sources including data of undetermined data types, mapping the data of the one or more user data sources to one or more of the predetermined data types, determining a data analytic goal for the mapped one or more user data sources, selecting one or more modular data processing tools configured to process the one or more predetermined data types mapped to data of the mapped one or more user data sources to generate the data analytic goal, generating a data analysis pipeline configured to generate the data analytic goal, the data analysis pipeline including the mapped one or more user data sources and the one or more modular data processing tools, and processing the mapped one or more user data sources with the data analysis pipeline to generate the data analytic goal. In this aspect, the method may additionally or alternatively include, retrieving a plurality of data sources from private and public databases, mapping data of each data source of the plurality of data sources to the predetermined data types, storing the plurality of mapped data sources, determining whether the one or more modular data processing tools require a second predetermined data type that was not mapped to data of the mapped one or more user data sources to generate the data analytic goal, if the one or more modular data processing tools require the second predetermined data type: selecting a second mapped data source from the plurality of mapped data sources that includes data mapped to the second predetermined data type, and adding the second mapped data source to the data analysis pipeline. In this aspect, the method may additionally or alternatively include, wherein the user input further includes the data analytic goal for the mapped one or more user data sources. In this aspect, the method may additionally or alternatively include, wherein the data analytic goal is determined based on the one or more predetermined data types mapped to data of the mapped one or more user data sources. In this aspect, the method may additionally or alternatively include, wherein determining the data analytic goal further comprises: determining a plurality of modular data processing tools that are configured to process the one or more predetermined data types mapped to data of the mapped one or more user data sources to generate a plurality of data analytic goals, presenting a list of the plurality of data analytic goals generated by the plurality of modular data processing tools to the user, and receiving a user selection of the data analytic goal from the list of the plurality of data analytic goals. In this aspect, the method may additionally or alternatively include, searching an Internet database for a plurality of non-platform data processing tools, processing a summary for each of the plurality of non-platform data processing tools to determine one or more non-platform data processing tools configured to generate the data analytic goal, and presenting the one or more non-platform data processing tools to the user. In this aspect, the method may additionally or alternatively include, receiving a user selection of a non-platform data processing tool from the one or more non-platform data processing tools presented to the user, generating an advertisement for a work request to convert the selected non-platform data processing tool to a new modular data processing tool configured to perform data processing on the predetermined data types to generate the data analytic goal, and presenting the advertisement for the work request to another user. In this aspect, the method may additionally or alternatively include, wherein selecting a modular data processing tool further comprises: determining a plurality of modular data processing tools that are configured to process the one or more predetermined data types mapped to data of the mapped one or more user data sources to generate the data analytic goal, presenting the user with a ranked list of the plurality of modular data processing tools, and receiving a user selection of the modular data processing tool from the ranked list. In this aspect, the method may additionally or alternatively include, storing the generated data analysis pipeline configured to generate the data analytic goal, annotating the generated data analysis pipeline with a description of the one or more modular data processing tools and the data analytic goal, and presenting the generated data analysis pipeline to other users.

Another aspect provides a client computing device comprising: a processor, and a client electronic data analysis platform program executed by the processor, the client electronic data analysis platform program configured to: receive a user input of one or more user data sources, the one or more user data sources including data of undetermined data types, send the one or more user data sources to a server device, receive, from the server device, mapped one or more user data sources including data mapped to one or more predetermined data types, determine a data analytic goal for the mapped one or more user data sources, send the data analytic goal to the server device, receive, from the server device, one or more modular data processing tools configured to process the one or more predetermined data types mapped to data of the mapped one or more user data sources to generate the data analytic goal, each modular data processing tool configured to perform data processing with the predetermined data types and to combine with other modular data processing tools in a data analysis pipeline, present, to a user of the client computing device, a data analysis pipeline configured to generate the data analytic goal, the data analysis pipeline including the mapped one or more user data sources and the one or more modular data processing tools, and process the mapped one or more user data sources with the data analysis pipeline to generate the data analytic goal. In this aspect, the client computing device may additionally or alternatively include, wherein data analytic goal is determined based on the one or more predetermined data types mapped to data of the mapped one or more user data sources.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A server device comprising:
 a processor; and
 an electronic data analysis platform program executed by the processor, the electronic data analysis platform program configured to:
  store a plurality of modular data processing tools, each modular data processing tool configured to perform data processing with predetermined data types and to combine with other modular data processing tools in a data analysis pipeline;
  receive a user input of one or more user data sources, the one or more user data sources including data of undetermined data types;
  map the data of the one or more user data sources to one or more of the predetermined data types;
  determine a set of modular data processing tools that are configured to perform data processing with the one or more predetermined data types of the mapped one or more user data sources;
  determine a set of data analytic goals that are generated by the determined set of modular data processing tools;
  select a data analytic goal for the mapped one or more user data sources from the determined set of data analytic goals;
  select one or more modular data processing tools configured to process the one or more predetermined data types mapped to data of the mapped one or more user data sources to generate the data analytic goal;
  generate a data analysis pipeline configured to generate the data analytic goal, the data analysis pipeline including the mapped one or more user data sources and the one or more modular data processing tools; and
  process the mapped one or more user data sources with the data analysis pipeline to generate the data analytic goal.

2. The server device of claim 1, wherein the electronic data analysis platform program is further configured to:
 retrieve a plurality of data sources from private and public databases;
 map data of each data source of the plurality of data sources to the predetermined data types;
 store the plurality of mapped data sources;
 determine whether the one or more modular data processing tools require a second predetermined data type that was not mapped to data of the mapped one or more user data sources to generate the data analytic goal;
 if the one or more modular data processing tools require the second predetermined data type:
  select a second mapped data source from the plurality of mapped data sources that includes data mapped to the second predetermined data type; and
  add the second mapped data source to the data analysis pipeline.

3. The server device of claim 1, wherein to select the data analytic goal, the electronic data analysis platform program is further configured to:
 present a list of the set of data analytic goals generated by the determined set of modular data processing tools to the user; and
 receive a user selection of the data analytic goal from the list of the set of data analytic goals.

4. The server device of claim 1, wherein the electronic data analysis platform program is further configured to:
 search an Internet database for a plurality of non-platform data processing tools not stored on the electronic data analysis platform program;
 process a summary for each of the plurality of non-platform data processing tools to determine one or more non-platform data processing tools configured to generate the data analytic goal; and
 present the one or more non-platform data processing tools to the user.

5. The server device of claim 4, wherein the electronic data analysis platform program is further configured to:
 receive a user selection of a non-platform data processing tool from the one or more non-platform data processing tools presented to the user;
 generate an advertisement for a work request to convert the selected non-platform data processing tool to a new modular data processing tool configured to perform data processing on the predetermined data types to generate the data analytic goal; and
 present the advertisement for the work request on the electronic data analysis platform program.

6. The server device of claim 1, wherein to select a modular data processing tool, the electronic data analysis platform program is further configured to:

determine a plurality of modular data processing tools that are configured to process the one or more predetermined data types mapped to data of the mapped one or more user data sources to generate the data analytic goal;

present the user with a ranked list of the determined plurality of modular data processing tools; and receive a user selection of the modular data processing tool from the ranked list.

7. The server device of claim 1, wherein the electronic data analysis platform program is further configured to:

store the generated data analysis pipeline configured to generate the data analytic goal;

annotate the generated data analysis pipeline with a description of the one or more modular data processing tools and the data analytic goal; and present the generated data analysis pipeline to other users of the electronic data analysis platform program.

8. The server device of claim 1, wherein the electronic data analysis platform program is further configured to programmatically select the data analytic goal from the set of data analytic goals generated by the set of modular data processing tools.

9. A method comprising:

storing a plurality of modular data processing tools, each modular data processing tool configured to perform data processing with predetermined data types and to combine with other modular data processing tools in a data analysis pipeline;

receiving a user input of one or more user data sources, the one or more user data sources including data of undetermined data types;

mapping the data of the one or more user data sources to one or more of the predetermined data types;

determining a set of modular data processing tools that are configured to perform data processing with the one or more predetermined data types of the mapped one or more user data sources;

determining a set of data analytic goals that are generated by the determined set of modular data processing tools;

selecting a data analytic goal for the mapped one or more user data sources from the determined set of data analytic goals;

selecting one or more modular data processing tools configured to process the one or more predetermined data types mapped to data of the mapped one or more user data sources to generate the data analytic goal;

generating a data analysis pipeline configured to generate the data analytic goal, the data analysis pipeline including the mapped one or more user data sources and the one or more modular data processing tools; and processing the mapped one or more user data sources with the data analysis pipeline to generate the data analytic goal.

10. The method of claim 9, further comprising:

retrieving a plurality of data sources from private and public databases;

mapping data of each data source of the plurality of data sources to the predetermined data types;

storing the plurality of mapped data sources;

determining whether the one or more modular data processing tools require a second predetermined data type that was not mapped to data of the mapped one or more user data sources to generate the data analytic goal;

if the one or more modular data processing tools require the second predetermined data type:

selecting a second mapped data source from the plurality of mapped data sources that includes data mapped to the second predetermined data type; and adding the second mapped data source to the data analysis pipeline.

11. The method of claim 9, wherein selecting the data analytic goal further comprises:

presenting a list of the set of data analytic goals generated by the determined set of modular data processing tools to the user; and receiving a user selection of the data analytic goal from the list of the set of data analytic goals.

12. The method of claim 9, further comprising:

searching an Internet database for a plurality of non-platform data processing tools;

processing a summary for each of the plurality of non-platform data processing tools to determine one or more non-platform data processing tools configured to generate the data analytic goal; and presenting the one or more non-platform data processing tools to the user.

13. The method of claim 12, further comprising:

receiving a user selection of a non-platform data processing tool from the one or more non-platform data processing tools presented to the user;

generating an advertisement for a work request to convert the selected non-platform data processing tool to a new modular data processing tool configured to perform data processing on the predetermined data types to generate the data analytic goal; and presenting the advertisement for the work request to another user.

14. The method of claim 9, wherein selecting a modular data processing tool further comprises:

determining a plurality of modular data processing tools that are configured to process the one or more predetermined data types mapped to data of the mapped one or more user data sources to generate the data analytic goal;

presenting the user with a ranked list of the plurality of modular data processing tools; and receiving a user selection of the modular data processing tool from the ranked list.

15. The method of claim 9, further comprising:

storing the generated data analysis pipeline configured to generate the data analytic goal;

annotating the generated data analysis pipeline with a description of the one or more modular data processing tools and the data analytic goal; and presenting the generated data analysis pipeline to other users.

16. The method of claim 9, further comprising programmatically selecting the data analytic goal from the set of data analytic goals generated by the set of modular data processing tools.

17. A client computing device comprising:

a processor; and a client electronic data analysis platform program executed by the processor, the client electronic data analysis platform program configured to:

receive a user input of one or more user data sources, the one or more user data sources including data of undetermined data types;

send the one or more user data sources to a server device;

receive, from the server device, mapped one or more user data sources including data mapped to one or more predetermined data types;

receive, from the server device, a set of data analytic goals that are generated by a determined set of modular data processing tools, the determined set of modular data processing tools being configured to perform data processing with the one or more predetermined data types of the mapped one or more user data sources;

send a data analytic goal selected from the received set of data analytic goals to the server device;

receive, from the server device, one or more modular data processing tools configured to process the one or more predetermined data types mapped to data of the mapped one or more user data sources to generate the data analytic goal, each modular data processing tool configured to perform data processing with the predetermined data types and to combine with other modular data processing tools in a data analysis pipeline;

present, to a user of the client computing device, a data analysis pipeline configured to generate the data analytic goal, the data analysis pipeline including the mapped one or more user data sources and the one or more modular data processing tools; and process the mapped one or more user data sources with the data analysis pipeline to generate the data analytic goal.

* * * * *